United States Patent [19]

de Rooij

[11] Patent Number: 4,524,383
[45] Date of Patent: Jun. 18, 1985

[54] CAMERA FOR PICKING-UP COLORED PICTURES

[75] Inventor: Jacobus A. G. de Rooij, Breda, Netherlands

[73] Assignee: U.S. Philips Corporation, New York, N.Y.

[21] Appl. No.: 468,234

[22] Filed: Feb. 22, 1983

[30] Foreign Application Priority Data

Mar. 22, 1982 [NL] Netherlands ............ 8201168

[51] Int. Cl.³ .............................................. H04N 9/09
[52] U.S. Cl. .......................................... 358/55; 358/42
[58] Field of Search ............................ 358/41, 42, 55; 350/313, 315, 316, 318

Primary Examiner—Michael A. Masinick
Attorney, Agent, or Firm—Marc D. Schechter

[57] ABSTRACT

In a cassette for a camera, two filter wheels are provided. Each filter wheel is held between two guide wheels and a drive wheel. The drive wheel is driven by a miniature electric motor. For each filter wheel, one associated guide wheel is connected to a lever. By lifting the lever, the filter wheels are released and can be taken out of the cassette. A code field is provided along the circumference of each filter wheel. Each code field is read by reading means. In this way, each filter element on each filter wheel can be moved into the optical path of the camera. The electric connections terminate in a plug which during insertion of the cassette mates with a socket in a rear wall of the camera. The cassette may also be provided with a test-slide projector for focusing the pickup tubes in a camera.

20 Claims, 9 Drawing Figures

CAMERA FOR PICKING-UP COLORED PICTURES

BACKGROUND OF THE INVENTION

The invention relates to a camera for picking up color pictures. The camera comprises a housing and an optical input system, a filter wheel carrying a number of filter elements, an optical distribution system and a number of pickup tubes in the housing.

The present-day color cameras usually comprises three pickup tubes. The tubes are positioned accurately with respect to an optical distribution system, for example a color-separating prism. The scene to be picked up is projected onto the windows of the pickup tubes via the optical input system and the color-separating prism. The color-separating prism separates the image of the scene into red, green and blue frames. A filter wheel carrying a number of filter elements is interposed between the optical input system and the color-separating prism. The filter elements may be, for example, gray filters, color filters or effect filters. By rotating the filter wheel, each of the filter elements can be moved into the optical path.

The filter wheel is mounted on a shaft which is driven by a gear wheel mechanism. The gear wheel mechanism is driven by an electric motor located in the housing of the camera. The size of the filter wheel is restricted by the space available in the camera.

The number of filter elements in the filter wheel is thus restricted to approximately five. This often makes it necessary to replace one filter wheel with another filter wheel, or to replace the filter elements in the filter wheel with other filter elements.

In either case the filter wheel has to be dismantled. The shaft through which the filter wheel is driven, however, is located in the interior of the camera and is not readily accessible. The result is that the replacement of the filter wheel is a laborious and time comsuming task.

SUMMARY OF THE INVENTION

It is therefore an object of the invention to provide a camera in which the filter wheel can be replaced in a simple manner. For that purpose, the filter wheel is arranged in a cassette in which there is also arranged an electric motor for driving the filter wheel. The cassette, in which the drive for the filter wheel is arranged, can be inserted into the camera and can be taken out of the camera in a simple manner. Outside the camera the filter wheel can be taken out of the cassette can be replaced by another filter wheel.

In an embodiment of the invention, the filter wheel is held at its circumference between at least two guide wheels and a drive wheel. The drive wheel is driven by the electric motor. Since the filter wheel is driven at its circumference the filter wheel can easily be replaced.

In another embodiment of the invention the filter wheel is urged against one guide wheel and against the drive wheel by the other guide wheel. The last guide wheel is connected to the cassette by means of a lever which is located by a spring. By lifting the lever the filter wheel is released. Then the filter can simply be taken out of the cassette and can be replaced by another filter wheel. The wire spring then urges the guide wheel against the newly inserted filter wheel.

In another embodiment of the invention, in that the filter elements are secured in the filter wheel by a push fit. By exerting a light pressure on the filter elements they can be removed from the filter wheel and can thus be rapidly and easily exchanged.

In yet another embodiment of the invention the filter wheel is provided near its circumference with a code field for each of the filter elements. The cassette has means for reading the code field. Since a given filter element is associated with a given code field, it is possible by means of a programmed control to control the filter wheel in such manner that any desired filter element can be positioned in the optical path.

Preferably the code field for each filter element is represented by the presence or absence of apertures at a series of positions on the filter wheel. The reading means are light emissive and photosensitive elements.

In still another embodiment of the invention at the two outermost positions of the series of positions associated with each filter element there are apertures which serve to start the reading of the intermediate positions. By choosing a given code the electric motor is started and the filter wheel starts to rotate. After detecting the code in question the electric motor stops the filter wheel. An aperture is present at each end of the code field, and one of these apertures, depending on the direction of rotation of the filter wheel, starts the detection.

Preferably the apertures at the two outermost positions also serve for accurately adjusting the position of the filter wheel. Particularly in those cases in which the filter wheel rotates rapidly, some time lapses between the detection of the selected code and the stopping of the filter wheel. As a result, the filter wheel rotates slightly too far so that the selected filter element is not in the correct position. In order to prevent this, after the selected code has been detected and the electric motor stops, the filter wheel is slowly rotated in the opposite direction until the two outermost apertures are detected by the relevant reading means.

In yet another embodiment of the invention in a similar manner to the first filter wheel, at least a second filter wheel is arranged in the cassette. The centre of the second filter wheel being offset with respect to the center of the first filter wheel in such manner that the two filter elements register with each other. By providing the cassette with several filter wheels the number of filter possibilities is considerably increased. The filter wheels are offset with respect to each other to permit the reading of the code fields of the filter wheels.

In a further embodiment of the invention, test-slide projector having a test slide is provided in the cassette for focussing the pickup tubes. In the cameras commonly used nowadays, the test pattern of a test slide is directed onto a semipermeable mirror of a lens element in the optical input system via at test-slide projector outside the camera. The mirror reflects the test pattern onto the windows of the pickup tubes. As a result of this, repeated adjustment has to be carried out when the optical input system is changed. By accommodating the test-slide projector in the cassette for the filter wheels, the focusing of the pick-up tubes becomes independent of the type of optical input system used.

In another embodiment of the invention, the test-slide projector comprises a projection lamp, at least one lens, and a sliding mechanism. The sliding mechanism can be moved by means of an electric motor. The sliding mechanism comprises an input mirror and an output mirror. Since the picture of a test slide is to be projected onto the pickup tubes only during adjustment, a movable sliding mechanism is used to do this. When the tubes are to be adjusted the sliding mechansim is moved so that the input mirror is positioned in the light beam from the projection lamp. From the input mirror a test slide is projected on the pickup tubes via the output mirror. In one embodiment the test slide is located in front of the input mirror and in another embodiment it is located between the input mirror and the output mirror.

The test slide may comprise two equal parts which are located at some distance from each other. When focusing a pickup tube, adjustment is carried out at the maximum amplitude of the high frequency signal which is derived from the signal electrode of the tube upon projection of a test slide onto the pickup tube. Since the system of lenses of the test-slide projector has a comparatively small aperture, the picture of a test slide projected onto the pickup tube has a comparatively large depth of focus. This makes the accurate adjustment to maximum amplitude particularly difficult. This problem is solved by providing a slide strip on each side of the actual slide surface of the test slide. A pickup tube is now adjusted to equal amplitude of the signals of the two slide strips.

BRIEF DESCRIPTION OF THE DRAWING

FIG. 2b is a rear elevation of the cassette of FIG. 2a.

FIG. 2c is a sectional view of part of a filter wheel of the cassette shown in FIG. 2a.

FIG. 2d is an enlarged view of a part of a filter wheel of the cassette shown in FIG. 2a.

DESCRIPTION OF THE PREFERRED EMBODIMENTS

Figure 1:
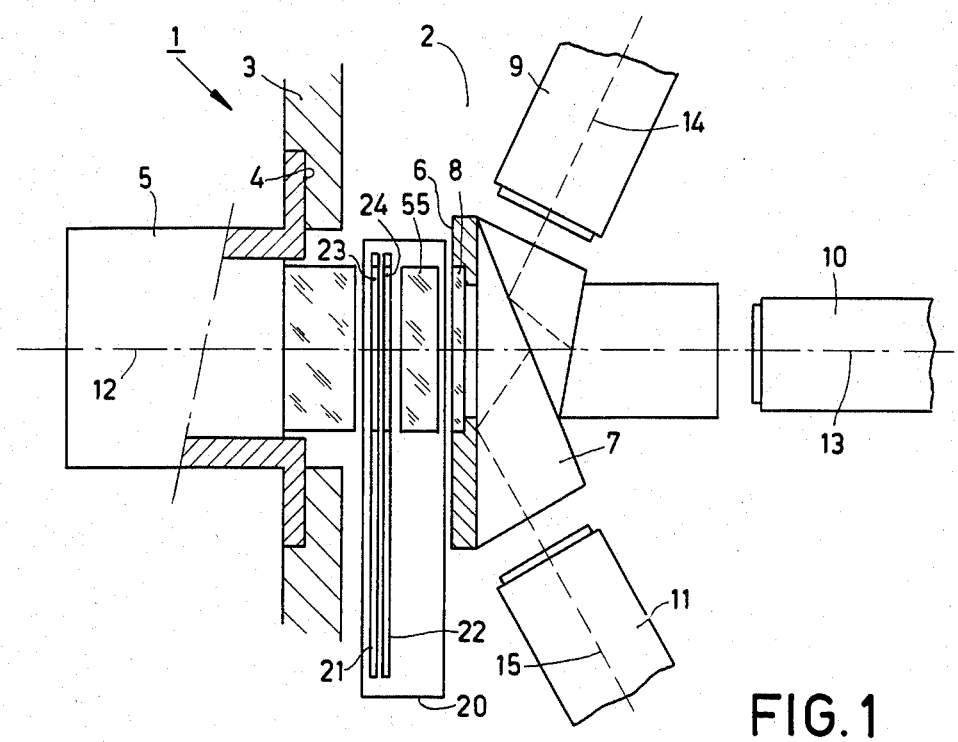
FIG. 1 is a partly schematic, partly sectional view of a portion of a camera according to the invention.

FIG. 1 is a partly schematic, partly sectional view of a portion of a camera. The camera 1 comprises a box shaped housing having a rear wall 2 and a front side wall 3. The side wall 3 has an abutment face 4 for the optical input system 5. The housing also has an abutment face 6 for a color-separating prism 7 and a glass retardation plate 8. The color-separation prism 7 separates the incoming picture into red, blue and green pictures.

Three pickup tubes 9, 10 and 11 adjoin the color-separating prism 7. Each tube has an input windows with a target.

The optical axis 12 of the optical input system 5 and the axes 13, 14 and 15 of the pickup tubes 9, 10 and 11 are situated in one plane. The axis 12 coincides with the axis 13.

A cassette represented by the rectangle 20 is situated between the optical input system 5 and the abutment face 6. Two filter wheels 21 and 22, carrying filter elements 23 and 24 respectively, are provided in the cassette 20. Selectively, one of the filter elements 23 and one of the filter elements 24 of the filter wheels 21 and 22, respectively, are located in the optical path.

The cassette 20 further comprises a glass plate 55. Plate 55 serves to lengthen the optical path length. The cassette 20 can be taken out of the camera as a unit.

Figure 2A:
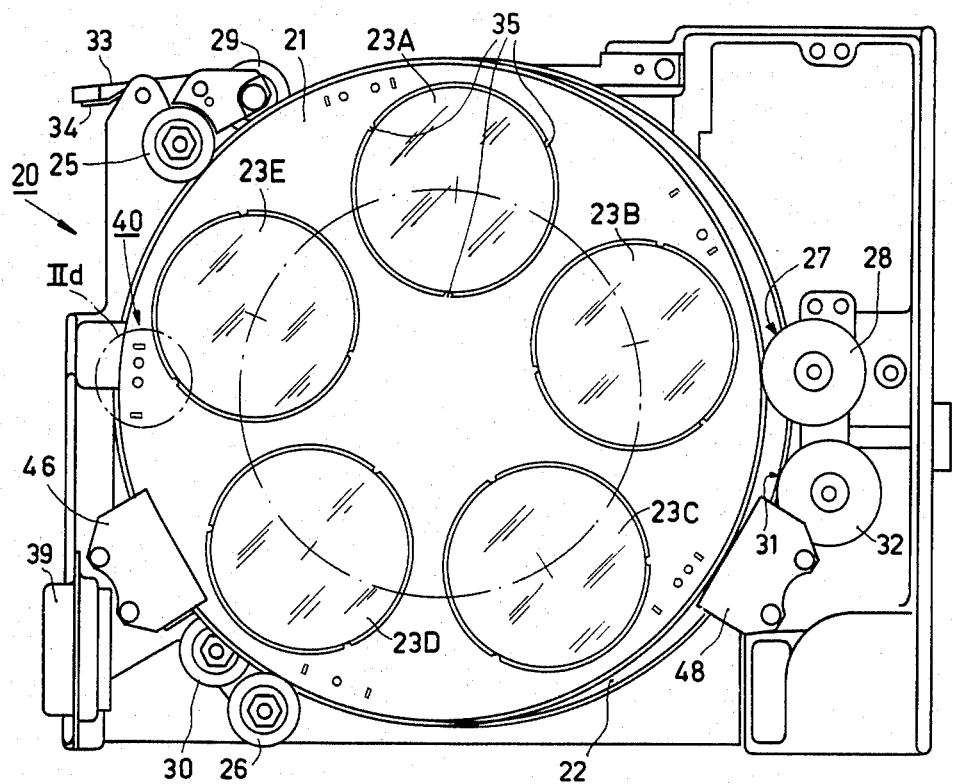
FIG. 2a is a front elevational view of the cassette of the camera shown in FIG. 1.
Figure 2C:
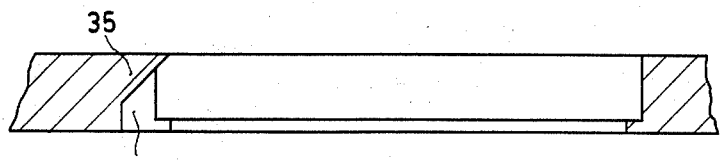
Figure 2D:
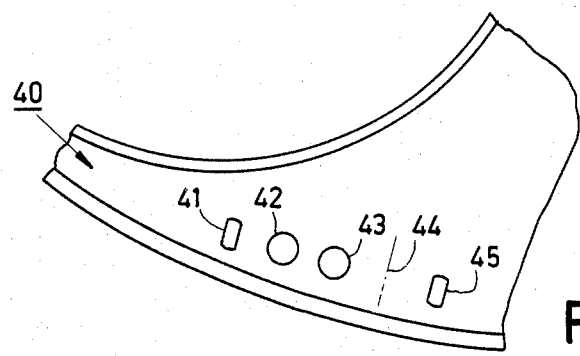
Figure 2B:
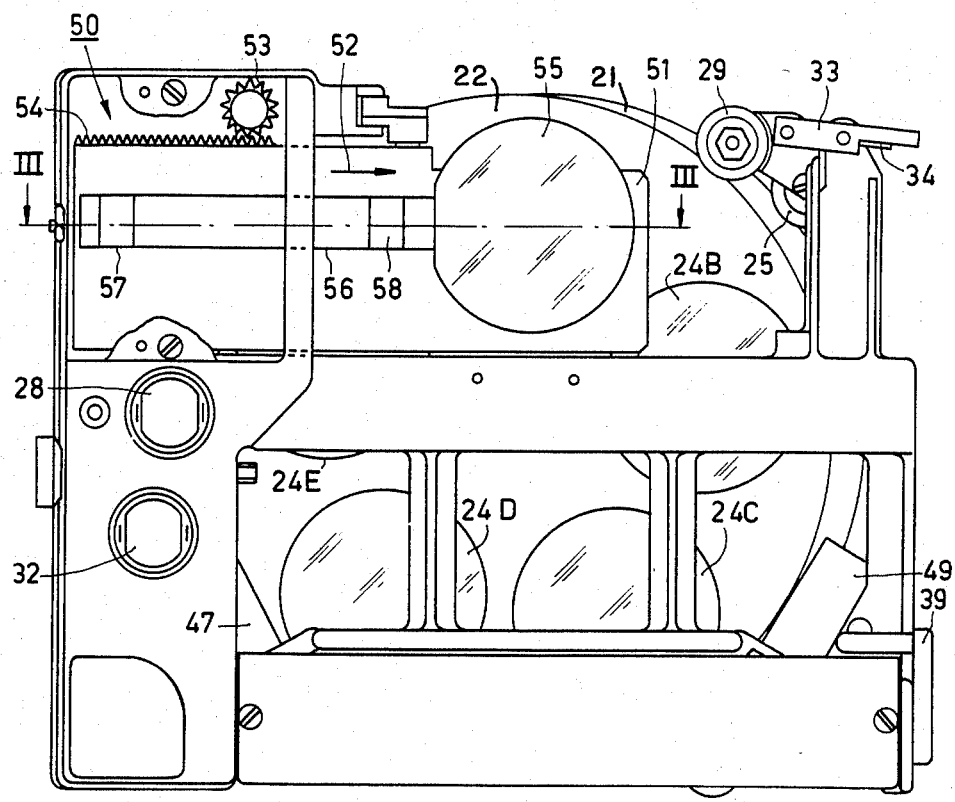

FIG. 2a is a front elevation and FIG. 2b is a rear elevation of the cassette 20. The filter wheel 21 has five filter elements 23A to 23E, and the filter wheel 2 has five filter elements 23A to 24E. Usually, one of the filter elements in each filter wheel is opaque and one is transparent. The remaining filter elements may be gray filters of different transmittance, color filters, or effect filters, and the like.

The filter wheel 22 is shifted with respect to filter wheel 21 in such a manner that upon rotation, filter elements from each wheel can be made to register with each other in the optical path. In FIG. 2a, the filter element 23A is located in the optical path and registers with filter element 24A (not visible). As a result of this, each of the filter elements 23A to 23E may be combined with each of the filter elements 24A to 24E, so that a very large number of combinations is obtainable.

The filter wheel 21 is held at its circumference between two guide wheels 25, and 26 and a drive wheel 27. Drive wheel 27 is driven by a miniature electric motor 28. In a similar manner, the filter wheel 22 is held at its circumference between two guide wheels 29 and 30 and a drive wheel 31. Drive wheel 31 is driven by a miniature electric motor 32.

The filter wheels 21 and 22 are manufactured from synthetic resin and can be easily rotated due to their low weight.

The guide wheels 25 and 29 are connected to a lever 33, lever 33 is pivotally connected to the cassette 20. A spring 34 also is connected to the lever 33 and urges the guide wheels 25 and 29 against the filter wheels 21 and 22. By lifting the lever 33, the filter wheels 21 and 22 are released and can easily be taken out of the cassette 20 and replaced by other filter wheels.

The filter elements are secured in apertures in the filter wheels 21 and 22 by means of a light push fit. As a result, the filter elements can easily be removed from the filter wheels 21 and 22 by exerting a light pressure on the filter elements. Referring to FIG. 2c, the push fit is provided by three angularly spaced protrusions 35 on the circumference of each aperture in the filter wheel. Recesses 36 are formed below the protrusions.

A code field 40 is provided along the circumference of each of the filter wheels 21 and 22 for each of the filter elements 23A to 23E and 24A to 24E, respectively. FIG. 2d shows such a code field 40.

The code field 40 for each filter element comprises five positions 41 to 45. At the two outermost positions 41 and 45 there are always apertures which are used for positioning the filter wheel. At each of the other positions 42, 43 and 44 there may or may not be an aperture. The presence of an aperture corresponds, for example, to a binary "0". The absence of an aperture corresponds for example, to a binary "1".

The positions 42, 43 and 44 form the code which determines the type of filter element in the optical path. In FIG. 2d an aperture is present at each of the positions 42 and 43, and no aperture is present at the position 44. This represents, for example, the code 001. When fitting the filter elements in the filter wheel the associated code is fixed for each filter element.

In order to read the code fields of both filter wheels 21 and 22, the filter wheels 21 and 22 are laterally offset relative to each other. The code fields of the filter wheel 21 are read by means of five light emitting diodes (LED's) which are mounted on a plate 46 and five phototransistors which are mounted on a plate 49. The plates 46 and 49 are located on opposite sides of the filter wheel 21. Similar means are provided on plates 47 and 48 to read the code fields of the filter wheel 22.

The electrical connections for the reading means as well as the connections for the miniature electric motors 28 and 32 terminate in a plug 39. When the cassette 20 is inserted in the camera, plug 39 mates with a corresponding socket on the rear wall of the camera.

When a given filter element of one of the filter wheels 21 or 22 is to be moved into the image path, the associated code, for example 001, is set on the control unit of the relevant filter wheel. As a result, the respective electric motor starts and the filter wheel begins to rotate. When one of the apertures 41 or 45 is detected by one of the two outermost phototransistors, the detection is started. When the code is detected by the reading means, the filter wheel is stopped. Since some time lapses between the detection and the stopping, however, the filter wheel rotates too far. After stopping, the filter wheel is then slowly rotated back until the apertures 41 and 45 are detected by the two outermost photo transistors. In this manner each filter element can be moved accurately into the optical image path.

The cassette 20 futher comprises a test-slide projector 50, a part of which is omitted from FIG. 2b for clarity. The test-slide projector 50 is used for focusing the pickup tubes. The test-slide projector 50 comprises a sliding mechanism 51. Mechanism 51 can be moved in the direction of the arrow 52 by means of a gear wheel 53 driven by a miniature electric motor. Gear wheel 53 meshes with a toothed rack 54 on the sliding mechanism 51.

The sliding mechanism 51 comprises a glass disc 55. In normal operation, the glass disc 55 is positioned in the optical path.

Figure 3:
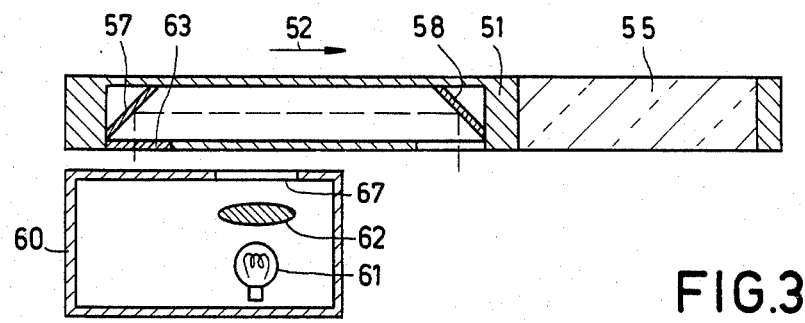
FIG. 3 is a sectional view taken on the line III—III in FIG. 2b.

The sliding mechanism 51 further comprises an optical part 56 having at least an input mirror 57 and an output mirror 58. FIG. 3 is a sectional view taken on the line III—III of FIG. 2b and includes a lighting unit 60 which is not shown in FIG. 2b. In the lighting unit 60, there are provided, inter alia, a projection lamp 61, a lens 62 and an aperture 67.

A test slide 63 is located in front of the input mirror 57 in the sliding mechanism 51. For focusing the pickup tube, the sliding mechanism 51 is moved in the direction of the arrow 52 until the input mirror 57 and the test slide 63 are positioned behind the aperture 67. The output mirror 58 then is located in the center of the optical path. The test slide 63 is now projected onto the targets on the windows of the pickup tubes via the input mirror 57 and output mirror 58.

The test slide 63 has a test pattern such that, upon scanning this image projected onto the targets, certain frequencies are present in the signal derived from the pickup tubes. The amplitude of the signal of these frequencies is maximum if the pick-up tube is present in the focused position.

Figure 4A:
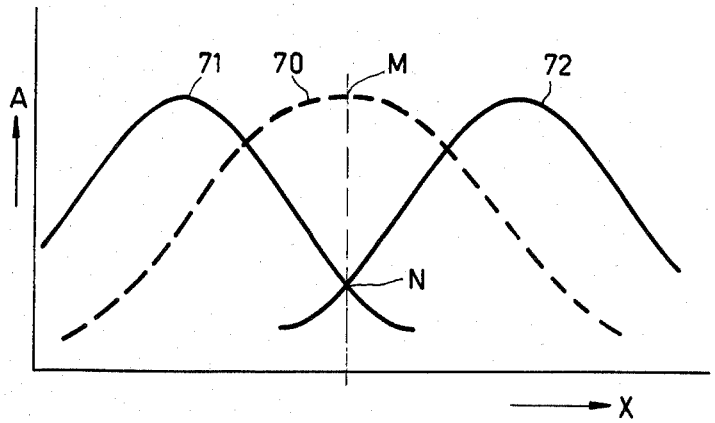
FIG. 4a is a graph showing the variation of the amplitude A of the signal derived from a pickup tube as a function of the position X of the pickup tube in various test slides.
Figure 4B:
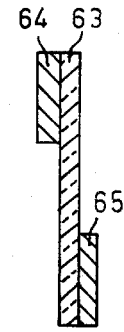
FIG. 4b is a sectional view of an embodiment of a test slide.

The optical system of the test-slide projector, with which the test slide 63 is projected onto the pickup tubes, has a comparatively small aperture. As a result, the reproduction of the test slide 63 on the pickup tubes has a comparatively large depth of focus. The curve which indicates the variation of the amplitude A as a function of the position X of the targets of the pickup tubes as a result of this has a comparatively flat variation near the maximum. In FIG. 4a the curve is indicated by the broken line 70. Adjusting a pickup tube to the maximum M is therefore not easy. FIG. 4b is a sectional view of a test slide with which the adjustment of the pickup tubes is facilitated. Slide strips 64 and 65, respectively, are now mounted on each side of the original slide 63. The slide strips are provided with the same test pattern instead of the slide 63. The curves corresponding to the strips 64 and 65 are indicated in FIG. 4a by 71 and 72, respectively. Focusing a pickup tube is now carried out by adjusting the signals of the slide strips 64 and 65, until they are equal (at point N which coincides with the maximum M in the curve 70). Moreover, focusing the pick-up tubes is easier in that the slope of the curves 71 and 72 at the area of the point N is large so that small variations in positional of the pickup tube result in larger signal variations.

Figure 5:
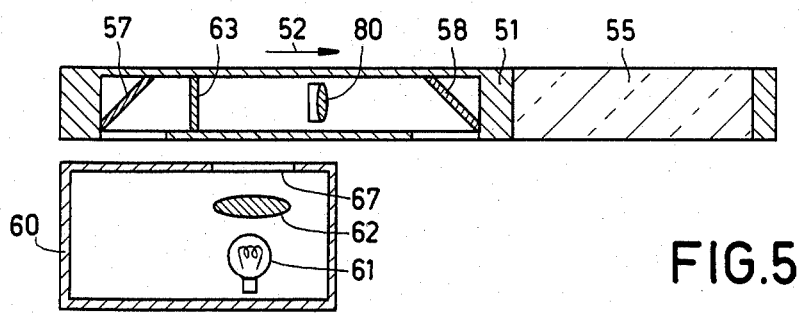
FIG. 5 is a sectional view of another embodiment of a slide projector.

FIG. 5 is a sectional view of another embodiment of a test-slide projector. This embodiment differs from the embodiment shown in FIG. 4a in that the test slide 63 is now located inside in the sliding mechanism 51 between the input mirror 57 and output mirror 58. In this case an extra lens 80 in the sliding mechanism is necessary.

In the embodiments shown, the cassette has two filter wheels. It is, of course, alternatively possible to construct the cassette with one filter wheel. The cassette may also be constructed without a test-slide projector. Within the scope of the invention many variations of the embodiments shown are possible.

What is claimed is:

1. A color camera comprising:
    a housing;
    an optical input system arranged in the housing on an optical axis;
    an optical distribution system arranged in the housing on the optical axis to receive light from the optical input system;
    a filter wheel arranged in the housing between the optical input system and the optical distribution system, said filter wheel having a number of filter elements which can be moved onto the optical axis between the optical input system and the optical distribution system by rotating the filter wheel; and
    a number of pickup tubes arranged in the housing to receive light from the optical distribution system;
    characterized in that:
    the filter wheel is arranged in a cassette in the housing; and
    the cassette comprises an electric motor for rotating the filter wheel.

2. A color camera as claimed in claim 1, characterized in that:
    the filter wheel has a circumference;
    the cassette further comprising first and second guide wheels and a drive wheel for holding the filter wheel, each guide wheel and filter wheel contacting the circumference of the filter wheel; and
    the motor rotates the drive wheel.

3. A color camera as claimed in claim 2, characterized in that:
    the first guide wheel is connected to the cassette by a spring-loaded lever; and
    the first guide wheel urges the filter against the second guide wheel and the drive wheel.

4. A color camera as claimed in claim 3, characterized in that the filter elements are secured on the filter wheel by a push fit.

5. A color camera as claimed in claim 4, characterized in that:
the filter wheel has code fields along its circumference, one code field associated with each filter element; and
the cassette further comprises means for reading the code fields.

6. A color camera as claimed in claim 5, characterized in that:
each code fiels is represented by the presence or absence of apertures at a series of positions on the filter wheel; and
the reading means comprises light-emitting and light-sensing elements.

7. A color camera as claimed in claim 6, characterized in that:
the code field has two outermost positions and a number of intermediate positions between the outermost positions, the intermediate positions identifying the type of filter element associated with the code field; and
apertures are provided at the two outermost positions of each code field in order to signal the reading means to read the intermediate positions.

8. A color camera as claimed in claim 7, characterized in that the apertures provided at the two outermost positions of each code field also are used to accurately adjust the position of the filter wheel.

9. A color camera as claimed in claim 8, characterized in that a second filter wheel is arranged in the cassette between the optical input system and the optical distribution system, said second filter wheel having a number of filter elements which can be moved onto the optical axis between the optical input system and the optical distribution system by rotating the second filter wheel, the second filter wheel being offset with respect to the first filter wheel.

10. A color camera as claimed in claim 9, characterized in that the cassette further comprises a test-slide projector having a test slide for use in focusing the pickup tubes.

11. A color camera as claimed in claim 10, characterized in that the test-slide projector comprises:
a projection lamp;
a lens behind the projection lamp;
a sliding mechanism having an input mirror and an output mirror, the input mirror being arranged behind the lens in at least one position of the sliding mechanism; and
an electric motor for moving the sliding mechanism.

12. A color camera as claimed in claim 11, characterized in that the test slide is located in front of the input mirror.

13. A color camera as claimed in claim 12, characterized in that the test slide comprises two equal parts which are spaced from each other.

14. A color camera as claimed in claim 11, characterized in that the test slide is located between the input mirror and the output mirror.

15. A color camera as claimed in claim 14, characterized in that the test slide comprises two equal parts which are spaced from each other.

16. A color camera as claimed in claim 2, characterized in that the filter elements are secured on the filter wheel by a push fit.

17. A color camera as claimed in claim 16, characterized in that:
the filter wheel has code fields along its circumference, one code field associated with each filter element; and
the cassette further comprises means for reading the code fields.

18. A color camera as claimed in claim 1, characterized in that a second filter wheel is arranged in the cassette between the optical input system and the optical distribution system, said second filter wheel having a number of filter elements which can be moved onto the optical axis between the optical input system and the optical distribution system by rotating the second filter wheel, the second filter wheel being offset with respect to the first filter wheel.

19. A color camera as claimed in claim 1, characterized in that the filter elements are secured on the filter wheel by a push fit.

20. A color camera as claimed in claim 19, characterized in that:
the filter wheel has code fields along its circumference, one code field associated with each filter element; and
the cassette further comprises means for reading the code fields.

* * * * *

UNITED STATES PATENT AND TRADEMARK OFFICE
CERTIFICATE OF CORRECTION

PATENT NO. : 4,524,383
DATED : June 18, 1985
INVENTOR(S) : JACOBUS A.G. DE ROOIJ It is certified that error appears in the above-identified patent and that said Letters Patent is hereby corrected as shown below:

In the Claims:

Claim 6, line 3 change "fiels" to --field--.

Signed and Sealed this

First Day of October 1985

[SEAL]

Attest:

DONALD J. QUIGG

Attesting Officer

Commissioner of Patents and
Trademarks—Designate